S. B. ECKERT.
DEVICE FOR WELDING BARRELS.
APPLICATION FILED JULY 1, 1912.
1,076,106.
Patented Oct. 21, 1913.
3 SHEETS—SHEET 1.
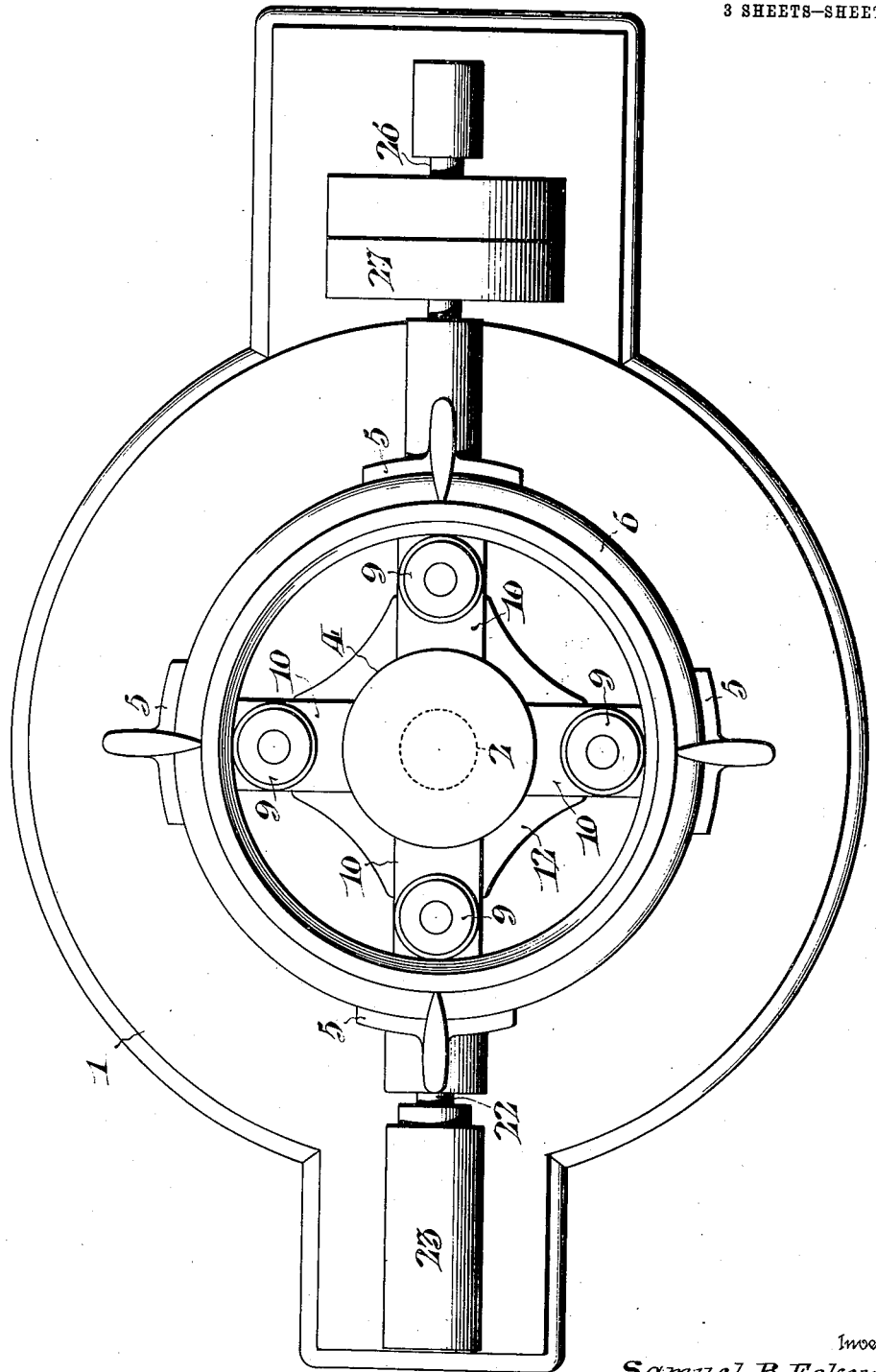
FIG. I.
Witnesses
John C. Bergner
James H. Bell
Inventor
Samuel B. Eckert,
by Emery & Paul
Attorneys

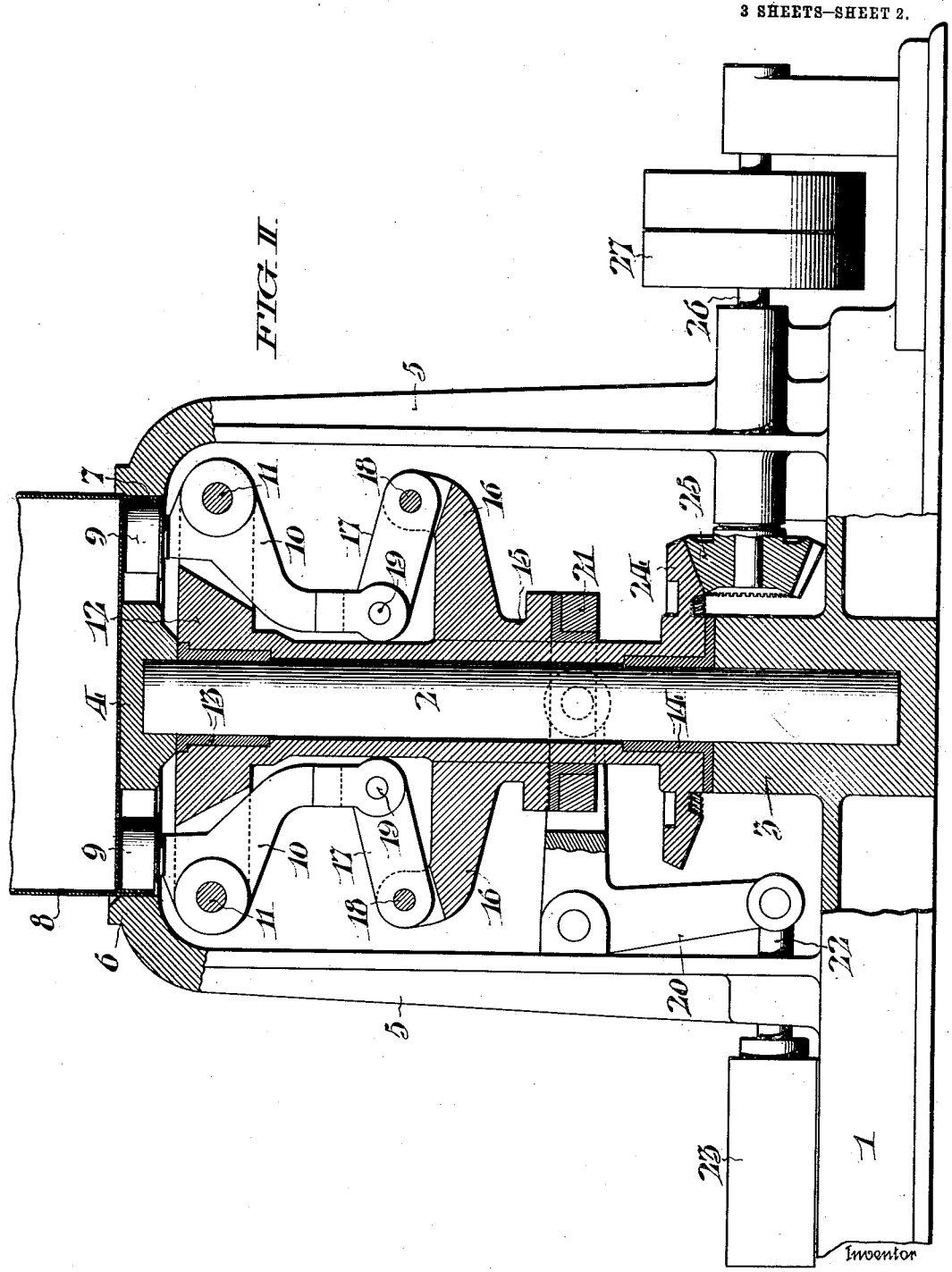

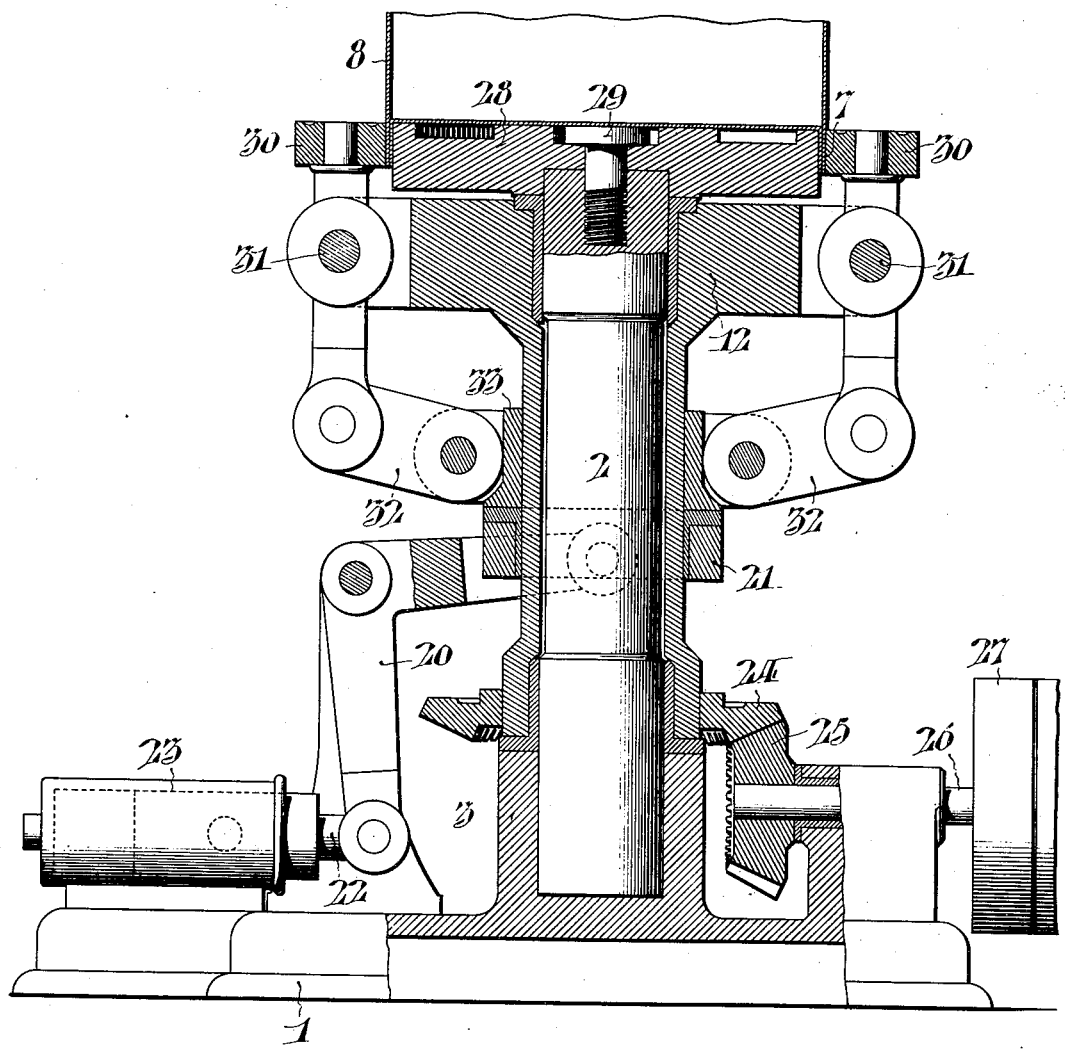

UNITED STATES PATENT OFFICE.

SAMUEL B. ECKERT, OF DEVON, PENNSYLVANIA.

DEVICE FOR WELDING BARRELS.

1,076,106.  Specification of Letters Patent.  Patented Oct. 21, 1913.

Application filed July 1, 1912. Serial No. 706,870.

*To all whom it may concern:*

Be it known that I, SAMUEL B. ECKERT, a resident of Devon, in the county of Chester and State of Pennsylvania, have invented certain new and useful Improvements in Devices for Welding Barrels, whereof the following is a specification, reference being had to the accompanying drawings.

The invention relates more particularly to devices for welding the head to the body of a metallic barrel, the metal parts of which have been preheated prior to the welding operation.

An object of the invention is to provide devices on which the barrel may be supported and held during the welding operation, together with rotating parts which are adapted to travel about the barrel and are pressed against the flange of the barrel to bring about the welding operation.

A further object of the invention is to provide a device of the above character, wherein a stationary chuck ring may be caused to engage the outer face of the flange of the barrel, while a plurality of welding rollers are pressed against and rotated bodily while in contact with the flange of the head for bringing about a welding of the head to the body of the barrel.

These and other objects will in part be obvious, and will in part be hereinafter more fully disclosed.

In the drawings, Figure I, is a plan view of a welding device embodying my improvements. Fig. II, is a part vertical section and part side elevation of the same. Fig. III, is a view similar to Fig. II, showing a modification of the invention.

The invention consists generally in providing a stationary support on which the head of the barrel may rest, during the welding operation, and a stationary chuck which, as shown in Figs. I, and II, engage the outer face of the flange of the body of the barrel, while, as shown in Fig. II, said stationary chuck engages the inner face of the flange on the head of the barrel. Coöperating with this stationary chuck are welding rollers which are carried by a rotating head. These rollers are mounted on swinging arms which are caused to press the rollers against the parts to be welded.

Referring more in detail to the drawings, my improved welding device consists of a supporting base 1, from which rises a standard 2. This standard is mounted in a socket 3, formed in the base 1. The standard is held from rotation by any suitable means. Mounted on the upper end of the standard is a stationary support 4, on which the head of the barrel is adapted to rest with the barrel in vertical position. Rising also from the supporting base 1, are a plurality of standards 5, which carry a stationary chuck 6, at their upper ends. This stationary chuck 6, is in the form of a ring, and is so shaped as to receive the flange 7, of the body of the barrel 8. The upper inner corner of the chuck is chamfered, so as to permit the barrel to be readily inserted in the stationary chuck. The inner surface of the stationary chuck is of such width as to engage the flange of the head of the barrel from a point adjacent the inner surface of the head to the outer edge of the flange.

A plurality of welding rollers 9, coöperate with the stationary chuck in welding the flange of the head to the flange of the body of the barrel. As herein shown, I have provided four welding rollers, each of which is carried by a pivoted arm 10. The arm 10, is pivoted at 11, to a rotating head 12. The rotating head 12, encircles the stationary standard 2, and is provided with suitable bearings 13, and 14, which engage the standard and the upper surface of the socket 3. This rotating head carries a sliding collar 15, which is splined thereto so as to slide longitudinally on the head. The collar 15, is formed with outwardly projecting arms 16, and links 17, are pivoted to these arms at 18. The other ends of the links 17, are pivoted at 19, to the arms 10, which carry the welding rollers 9. The collar 15, is slid on the rotating head by a rock lever 20, the horizontal arm of which is pivotally attached to a sliding collar 21, whose upper face abuts against the collar 15. As readily seen in Fig. II, the collar 21, will impart vertical movement to the collar 15, without rotating with the latter. The other arm of the rock lever 20, is connected to a plunger 22, of a pneumatically controlled cylinder 23. The head 12, carries a bevel gear 24, at its lower end, which meshes with a bevel gear 25, on the main shaft 26, which is driven by a pulley 27.

In Fig. III, I have shown a slightly modified form of the invention in that the stationary support and stationary chuck are formed as one in a disk 28, which is secured by a screw 29, to the upper end of the standard 2. The rotating head 12, is operated through the bevel gears 24, and 25, as above noted. This stationary chuck engages the inner face of the flange of the head, while the welding rollers 30, engage the outer face of the flange of the body of the barrel. These rollers are carried by arms pivoted at 31, to the rotating head 12, of the barrel, and the arms are swung about their pivots by links 32, which are pivoted to a sliding collar 33. The sliding collar 33, is moved endwise on the rotating head by a rock lever 20, which is connected to a plunger 22, controlled by the pneumatic cylinder 23.

In the operation of my device, the collar is slid on the rotating head, so as to move the welding rollers away from the stationary chuck. The barrel head is inserted in the end of the barrel, and the parts to be welded are heated to the proper welding temperature. The barrel is then placed on the stationary support with the flange of the barrel or the flange of the head in engagement with the stationary chuck. The pneumatic cylinder is then operated to bring the welding rollers into contact with the parts to be welded, and the main shaft causes the rotating head to revolve and the rollers to pass over the flange of the head or the flange of the barrel, and coöperating with the stationary chuck, forces the two flanges into welding contact. As soon as the parts are welded, the rollers are moved out of contact with the barrel and the same may be readily withdrawn from the device.

From the above description, it will be apparent that I have provided a welding device which is entirely free of any heating apparatus, and that the barrels to be welded may be quickly manipulated so that the preheating of the barrel is sufficient for the welding operation. By arranging the standard in a vertical position, the barrel will be properly supported during the welding operation.

It is obvious that minor changes in the details of construction and the arrangement of the parts may be made, without departing from the spirit of the invention, as set forth in the appended claims.

Having thus described my invention, I claim:

1. A device for welding metal barrels or the like, including in combination a chuck for engaging one side of the parts to be welded, a head, means for giving said head and chuck relative movements of rotation, a welding roller carried by said head, and means for moving said welding roller into engagement with the opposite side of the parts to be welded from that engaged by the chuck for pressing the parts against the chuck, whereby said welding roller and chuck coöperate in welding the parts.

2. A device for welding metal barrels or the like including in combination, a vertical standard, means carried thereby for engaging the end of the barrel for supporting the same, a rotating head, a welding roller or rollers carried by said head and adapted to engage the parts to be welded, and a stationary chuck engaging the opposite side of the parts to be welded and with which said welding roller, or rollers coöperate.

3. A device for welding metal barrels or the like including in combination, a vertical standard, means carried thereby for engaging the end of the barrel and for supporting the same, a rotating head, a welding roller or rollers carried by the head, means for moving said welding roller or rollers into contact with the flange of the head, and a stationary chuck for engaging the flange of the barrel and with which said roller, or rollers coöperate.

4. A device for welding metal barrels or the like including in combination, a vertical stationary standard, means carried thereby for engaging the end of the barrel for supporting the same, a rotating head mounted on said standard, arms pivoted to said rotating head, rollers carried by said arms, a sliding collar, devices for connecting the sliding collar with said arms for moving the rollers into and out of contact with the parts to be welded, and a stationary chuck coöperating with said welding rollers.

5. A device for welding metal barrels or the like including in combination, a supporting device, a vertical standard carried thereby, a rotating head mounted on said standard, means for rotating said head, arms pivoted to said rotating head, rollers carried by said arms, a sliding collar mounted on said head, links connecting said sliding collar to said arm and so disposed as to move the rollers into and out of contact with the parts to be welded, standards rising from said base, and a stationary chuck carried by said last named standards, engaging the outer face of the flange of the body of the barrel and coöperating with said welding rollers.

In testimony whereof, I have hereunto signed my name at Philadelphia, Pennsylvania, this twenty-fifth day of June, 1912.

SAMUEL B. ECKERT.

Witnesses:
JAMES H. BELL,
E. L. FULLERTON.